US009645816B2

(12) United States Patent
Shlosberg

(10) Patent No.: US 9,645,816 B2
(45) Date of Patent: May 9, 2017

(54) MULTI-LANGUAGE CODE SEARCH INDEX

(71) Applicant: LinkedIn Corporation, Mountain View, CA (US)

(72) Inventor: Vlad Shlosberg, San Francisco, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 0 days.

(21) Appl. No.: 14/866,123

(22) Filed: Sep. 25, 2015

(65) Prior Publication Data

US 2017/0090915 A1 Mar. 30, 2017

(51) Int. Cl.
*G06F 9/44* (2006.01)
*G06F 17/30* (2006.01)

(52) U.S. Cl.
CPC .......... *G06F 8/71* (2013.01); *G06F 17/30091* (2013.01); *G06F 17/30106* (2013.01); *G06F 8/20* (2013.01); *G06F 8/31* (2013.01); *G06F 8/36* (2013.01)

(58) Field of Classification Search
CPC ..... G06F 8/20; G06F 8/30; G06F 8/31; G06F 8/36; G06F 8/71; G06F 9/4428; G06F 9/44521
See application file for complete search history.

(56) References Cited

U.S. PATENT DOCUMENTS

| | | | | |
|---|---|---|---|---|
| 6,466,901 B1* | 10/2002 | Loofbourrow | ...... | G06F 17/2755 704/9 |
| 8,122,017 B1* | 2/2012 | Sung | ...... | G06F 8/33 707/723 |
| 9,052,979 B2* | 6/2015 | Balasubramanian | ..... | G06F 8/70 |
| 2005/0114771 A1* | 5/2005 | Piehler | ..... | G06F 17/21 715/264 |
| 2009/0228862 A1* | 9/2009 | Bertelrud | ..... | G06F 8/20 717/100 |
| 2010/0281461 A1* | 11/2010 | Tyler | ..... | G06F 8/41 717/106 |
| 2010/0287525 A1* | 11/2010 | Wagner | ..... | G06F 8/20 717/100 |

(Continued)

OTHER PUBLICATIONS

Atreya et al., "Building Multilingual Search Index using Open Source Framework", SANLP, Coling 2012, Dec. 2012, pp. 201-210; <https://www.cse.iitb.ac.in/~pb/papers/coling12-wssanlp-multilingual-index.pdf>.*

(Continued)

*Primary Examiner* — Thuy Dao
*Assistant Examiner* — Ben C Wang
(74) *Attorney, Agent, or Firm* — Hickman Palermo Becker Bingham LLP

(57) ABSTRACT

A method and apparatus for generating a code index for multiple types of code is provided. The method comprises: analyzing a plurality of files that includes a first file that contains first code in a first programming language and a second file that contains second code in a second programming language; identifying a first plurality of tokens within the first file based on a first tokenizing approach; identifying a second plurality of tokens within the second file based on a second tokenizing approach that is different than the first tokenizing approach; storing the first plurality of tokens and the second plurality of tokens within a particular index.

20 Claims, 4 Drawing Sheets

(56) References Cited

U.S. PATENT DOCUMENTS

| | | | |
|---|---|---|---|
| 2011/0131212 A1* | 6/2011 | Shikha | G06F 17/2229 707/741 |
| 2011/0209114 A1* | 8/2011 | Andersen | G06F 8/71 717/101 |
| 2012/0036457 A1* | 2/2012 | Perlman | G06F 8/71 715/760 |
| 2012/0047130 A1* | 2/2012 | Perez | G06F 8/34 707/723 |
| 2012/0072367 A1* | 3/2012 | Reisbich | G06F 8/20 705/348 |
| 2013/0104100 A1* | 4/2013 | Mueller | G06F 9/44 717/106 |
| 2013/0117733 A1* | 5/2013 | Ahmed | G06F 8/47 717/140 |
| 2013/0145343 A1* | 6/2013 | Warren | G06F 8/30 717/101 |
| 2013/0179147 A1* | 7/2013 | Alkharashi | G06F 17/2217 704/8 |
| 2013/0226555 A1* | 8/2013 | Lerum | G06F 9/4448 704/2 |
| 2013/0339365 A1* | 12/2013 | Balasubramanian | G06F 8/71 707/741 |
| 2014/0165032 A1* | 6/2014 | Balasubramanian | G06F 8/70 717/120 |
| 2014/0365994 A1* | 12/2014 | Vann | G06F 8/36 717/106 |
| 2014/0379661 A1* | 12/2014 | Marcus | G06F 17/30566 707/673 |
| 2015/0234654 A1* | 8/2015 | Balasubramanian | G06F 8/71 707/723 |
| 2016/0034532 A1* | 2/2016 | Ivchenko | G06F 17/30448 707/768 |
| 2016/0063120 A1* | 3/2016 | Ivchenko | G06F 17/30867 707/728 |

OTHER PUBLICATIONS

Nandi et al., "Lifespan-based Partitioning of Index Structures for Time-travel Text Search", ACM, CIKM'15, Oct. 2015, pp. 123-132; <http://dl.acm.org/citation.cfm?id=2806442&CFID=702092593&CFTOKEN=86071233>.*

Ilic et al., "Inverted Index Search in Data Mining", IEEE, Nov. 2014, pp. 943-946; <http://ieeexplore.ieee.org/stamp/stamp.jsp?tp=&arnumber=7034561>.*

* cited by examiner

MULTI-LANGUAGE CODE SEARCH INDEX

FIELD

The present disclosure relates generally to data processing and, more specifically, to systems and methods for indexing and retrieving stored code.

BACKGROUND

Software programmers within business entities write large amounts of software code to perform various tasks. Some of the code is used by other sections of code or can be re-used to perform other tasks. Many business entities maintain code repositories that store the code. However, these code repositories can be difficult to index and search. Software programmers are therefore less likely to attempt to search for previously-written code and more likely to write redundant code.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Improved systems and methods for indexing two or more types of code within a heterogeneous index are provided. Within a business entity, software programmers can write code in two or more programming languages depending, for example, on the nature of the task performed by executing the code, other code with which the code interacts, and the software programmer's own preferences. To allow software programmers to retrieve the code to modify the code or to use portions of the code to perform a different task, the code is indexed using a heterogeneous index. The heterogeneous index stores code written in different programming languages.

To store the code in such a way that it can be retrieved from the heterogeneous index, the code is indexed using a tokenizer (also referred to as a lexer) and a parser that corresponds to the language in which the code was written. Different programming languages can define tokens differently for the same sequence of characters. The tokenizer identifies tokens within in the code according to the programming language in which the code is written. A token is a string of characters which forms a syntactic unit. The parser receives the code and builds a heterogeneous index, such as a Lucene software library, to generate a structural representation of the code.

Upon generation of the data structure, a consultant computer can query the data structure to find code comprising two or more tokens included in the query. The query can be processed using a search server, such as Elasticsearch, Solr, or Lucene. The results of the search query may include two or more blocks of code written in two or more programming languages and containing the tokens included in the query.

System Overview

Figure 1:
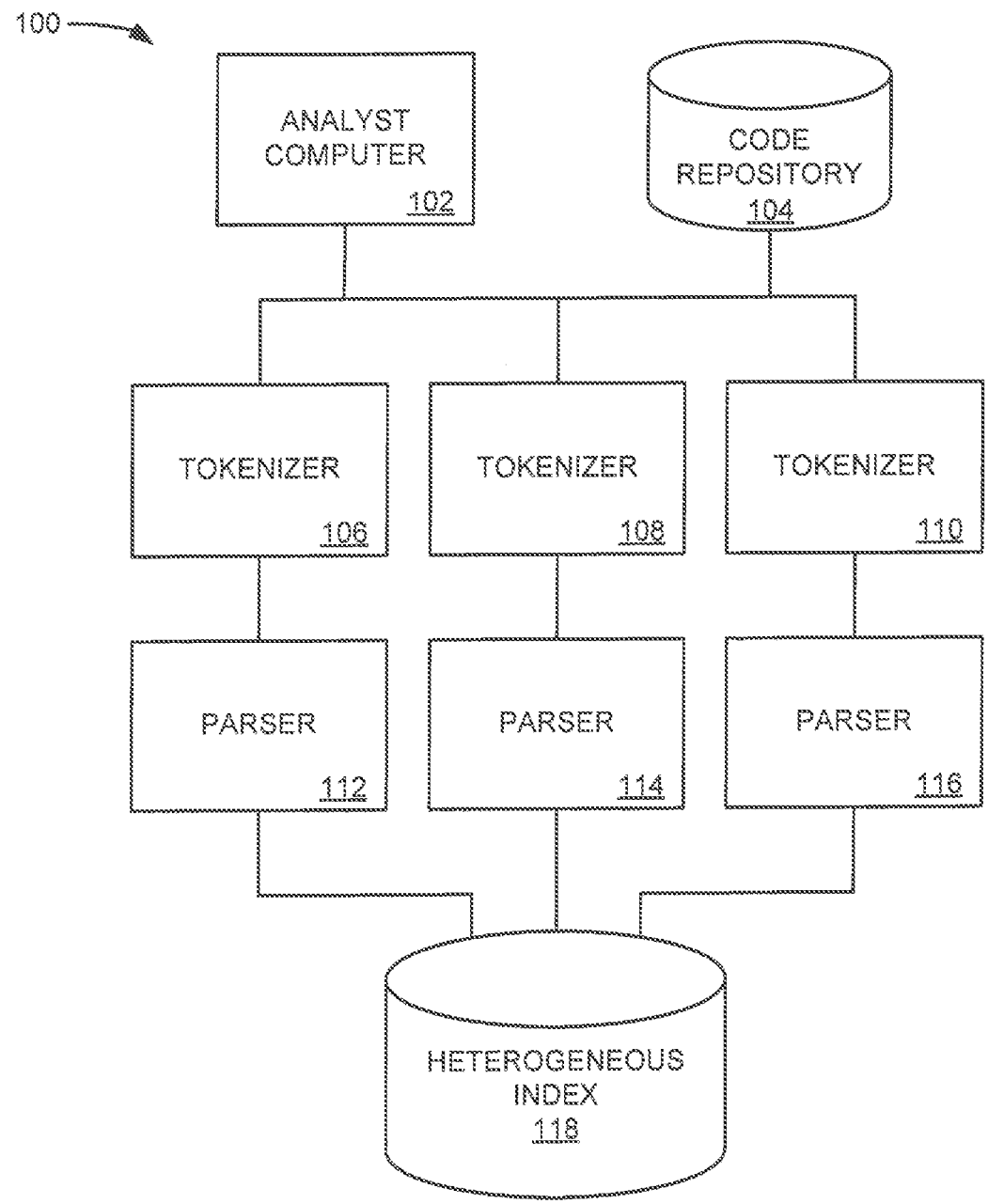
FIG. 1 depicts an example computing system, according to various embodiments.

FIG. 1 depicts an example computing system 100, according to various embodiments. The computing system 100 is used to store code written in two or more programming languages and to allow computer programmers to search for code in a way that is agnostic to which programming language the code is written in. The computing system 100 comprises an analyst computer 102, a code repository 104, programming language-specific tokenizers 106, 108, and 110, programming language-specific parsers 112, 114, and 116, and a heterogeneous index 118.

Analyst computer 102 comprises one or more computing devices, including but not limited to, work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, and the like. Analyst computer 102 includes applications such as a web browser, software, and/or other executable instructions to facilitate various aspects of the techniques described herein. Analyst computer 102 may also include additional applications or other interface capabilities to communicate with the other components of the computing system 100. The computing system 100 may comprise a plurality of analyst computers that, depending on the embodiment, are located geographically dispersed from each other. Although one analyst computer 102 is shown in FIG. 1, more than one analyst computer 102 may be included in system 100.

Code repository 104 comprises memory containing code written by software programmers. The code stored in the code repository 104 may be written in two or more computing languages. Some portions of the code stored in the code repository 104 can be stored according to an index or other data structure. The code repository 104 can, in some embodiments, be queried using other techniques, such as programming language-specific techniques.

The tokenizer 106, 108, and 110 are respectively configured to tokenize the code stored in the code repository. Tokenizers can also be referred to as lexers. Each tokenizer is configured to tokenize the code according to one or more programming languages using a corresponding tokenizing approach. A token is a structure representing a lexeme that explicitly indicates its categorization for the purpose of parsing. Examples of token categories may include "identifier" and "integer literal", although the set of token categories differ in different programming languages. Some tokenizers may tokenize by space. The process of forming tokens from stored code is called tokenization. The computer system 100 may include more or fewer than three tokenizers depending on, for example, the number of programming languages supported by the code repository 104.

To illustrate how an expression can be tokenized differently across different programming languages, consider the expression "a–b", or "a minus b". In the programming language Java, the tokenization of "a–b" results in tokens "a", "b", "–". In CSS the minus sign is not a special character, so "a–b" tokenizes to one token: "a–b". Other programming languages may be tokenized in the same way as Java or CSS or may result in different tokens being created.

The parsers 112, 114, and 116 are respectively configured to parse code stored in the code repository 104 and tokenized by one of the tokenizers 106, 108, and 110. Parsing is the formal analysis by a computer of an expression in code tokenized into its constituents (e.g., tokens), and results in a parse tree showing their syntactic relation to each other, which may also contain semantic and other information. Each parser 112, 114, and 116 is language-specific.

For example, in a programming language, an expression may be "public class car extends vehicles implements Driveable, Steerable, Wheelable". The expression can be tokenized to tokens "public", "class", "car", "extends", "vehicles", "implements", "driveable," "steerable," and "wheels". When parsed, the relationships contained in the expression can be stored as a tree such that the relationships can be searched for. In some implementations, each parse tree may be language-specific and stored as a B-Tree or hash.

The tokenized and parsed code is stored as a table within a heterogeneous index 118. One example of the heterogeneous index is Lucene, a free open source information retrieval software library supported by the Apache Software Foundation and released under the Apache Software License. The heterogeneous index 118 can include trees and tokens from each of the programming languages. In some instances, the heterogeneous index can be partitioned according to programming language. In other embodiments, the heterogeneous index 118 is not partitioned. In these embodiments, each token is tagged with one or more tags identifying the programming language of the token. The tags can be stored in a variety of ways, including, for example, as an in-memory hash table.

The heterogeneous index 118 may comprise a table having one or more stored associations between each token and portions or segments of code that contain the respective token. In some embodiments, the portion or segments of code are identified in the heterogeneous index 118 as a tuple of the form {filename, programming language, line number}. For example, a token "public" may be associated with code segment {foo.java.1000} and with code segment {bar.java.585}. In this example, both associated segments of code are written in Java but this is not always the case. For example, token "logo" may be associated with code segments {foo.java.674} written in Java, {code.css.342} written in CSS, and {interface,html,21} written in HTML. Using the tuple, the analyst computer 102 can retrieve the code segments from the code repository 104.

Further, the heterogeneous index 118 can include one or more tokens that correspond to a code block generated by other code on an as-needed basis. Examples of code blocks that are generated include, but are not limited to, classes, functions, namespaces, packages, and enumerated types. The generated code block is not stored in the code repository 104. Instead, the code used to generate the code block is stored. To illustrate, a code file written in JSON named "a.json" can generate "public class foo" when built:

```
a.json:
    {name=foo
    fields={
        name=bar
        type=Boolean
        }
    }
```

In this embodiment, the tokens "public", "class", and "foo" are stored in the heterogeneous index 118 in association with the file "a.json" even though "public" and "class" do not appear within the code itself.

The analyst computer 102 is used to submit queries to the heterogeneous index 118 and search the heterogeneous index 118 for one or more tokens. The analyst computer 102 can perform the search using various search tools. In some embodiments, Elasticsearch is used to query a Lucene software library forming the heterogeneous index 118. The search query is processed by one or more of the tokenizers 106, 108, and 110 and the respective parsers 112, 114, and 116. The search query does not necessarily specify which tokenizers and parsers to use when processing the query, as shown in the tables below. Both lexers and parsers are used to process the search query. Search programs like Elastic Search have their own tokenizers and parsers to parse the parts of the query and define meanings for words like "AND" so that you can search for those terms, however passing a query such as "'hello world" AND "potato'" forces all of the language-specific lexers to try to analyze the phrase "hello world" and "potato" independently. The java processor and CSS processor convert those phrases into tokens to be searched.

The analyst computer 102, when using Elasticsearch, can query by text and/or by keywords. Keywords are tokens that indicate structure within the code. Keywords and their corresponding structures are programming language-specific and can be extracted by the parsers 112, 114, and 116. Examples of keywords in Java include, but are not limited to, "extends" and "implements".

Non-limiting examples of searches that can be performed are included in Table 1, below:

TABLE 1

| SEARCH FUNCTION | EXAMPLE SEARCH QUERY |
|---|---|
| Files with the text or filename 'foo' | 'foo' |
| Files with the extension java and with the text or filename 'foo' | 'foo' AND extension:java |
| For files in MyRepo with the java extension | repo:MyRepo AND extension:.java |
| To search more precisely using regular expressions ("RegEx"), wrap the RegEx in "/" forward-slashes) | name:/foo/ |
| To replace one character in the search query, use "?" | name:/foo?/ |
| To match one or more characters, use "*" | name:/f?oo*s/ |
| Searching for language-specific constructs: CSS - object with name containing 'ei' and text 'foo' | css.objects.name:*ei* AND 'foo' |

In some embodiments, search queries can include the following operators and special characters as shown in Table 2:

TABLE 2

| SEARCH QUERY | RESULTS |
|---|---|
| hello AND world AND potato | code containing the tokens "Hello" and "world" and "potato" |
| hello OR world | code containing the token "Hello" OR the token "world" |
| hello NOT world | code containing the tokens "Hello" but not the token "world" |
| "hello world" | code containing the tokens in the exact sequence "hello world" |
| hello AND (world OR potato) | code containing the token "Hello" and either the token "world" or the token "potato" |
| *ello* | code containing a token that has a few characters followed by a "ello" followed by a few more characters |

TABLE 2-continued

| SEARCH QUERY | RESULTS |
|---|---|
| H?llo | code containing a token that starts with "H" then any one character followed by "llo" |

Search queries can include one or more field names, as shown in Table 3:

TABLE 3

| SEARCH QUERY | RESULTS |
|---|---|
| repo:MyRepo | code where the repository is called "MyRepo" |
| "Hello World" | code containing the token "hello world" or the tokens "hello" and "world" in sequence. |
| product.externals.*:Hello | code where the product has an external dependency to a package, library, or version called "Hello" |
| _missing_:module | code having no associated module |
| _exists_:module | code having a defined "module" value |

Regular expression patterns can be embedded in the query string by wrapping them in forwardslashes ("/"). For example, as shown in TABLE 4:

TABLE 4

| SEARCH QUERY | RESULTS |
|---|---|
| name:/hell?World\.((java)\|(jsp))/ | code having a name similar to "helloWorld" (where the "o" can be replaced with any letter) and end with the extension ".java" or ".jsp" |

Besides searching for tokens, a search query can specify a field to search within the code, as depicted in table 5:

TABLE 5

| FIELD | SEARCH QUERY | DESCRIPTION |
|---|---|---|
| name | name:Hello.java | Finds the file where the file name is "hello.java" |
| extension | extension:.java | Finds all files with the extension .java |
| repo | repo:MyRepo | Finds all files in the MyRepo repository |
| project | project:network | Finds all files in the network product |
| contentType | contentType:image/jpeg | Finds all files with this content type. (Most code files have the content type of text/plain) |
| size | size:>10000 | Finds all files that are bigger than 10,000 bytes. |
| directory | directory:/myDirectory/* | Finds all files in the directory that starts with/myDirectory |
| createdDate | createdDate:<20140123T13:30:00Z | Finds all files where the created date and time is before Jan. 23, 2014 1:30 PM UTC |
| lastModified | lastModified>20140123T13:30:00Z | Finds all files where the last modified date and time is before Jan. 23, 2014 1:30 PM UTC |
| storedDate | storedDate:<20140123T13:30:00Z | Finds all files which were indexed before Jan. 23, 2014 1:30 PM UTC. |

In some embodiments, language-specific searches can be performed. While indexing specific files which are known to be code files (such as .java, .css), the parsers 112, 114, and 116, parse out specific features of the file and build an index separately around them. For example, when files such as java files are parsed, the parser can parse the code to identify relationships between tokens like "public final class hello extends . . . " and parse those tokens into separate buckets. This provides the ability to search for a location where a specific class is defined instead of just searching for the text that contains the class name and to find everywhere a specific class is extended or an interface is implemented. This solves the problem of trying to do exact searches when there are unknown factors. For example, declaring class "A" as "public abstract class A" is the same as declaring it as "abstract public class A". Instead of having to look for those exact strings, a search query such as "jre.objects.name:A AND jre.objects.labels:abstract" results include any file which has a class named "A" and has the label "abstract".

For example, JRE programming language such as Java and scala are compatible and can be grouped with each other as a single search type, as shown in table 6:

TABLE 6

| FIELD | EXAMPLE | DESCRIPTION |
|---|---|---|
| jre.package | jre.package:com.company.package | Finds the files where the package name is com.company.package |
| jre.imports | jre.imports:*MyClass | Finds all files which have an import to the MyClass object. |
| jre.objects.name | jre.objects.name:MyClass | Finds all files where the MyClass class isdefined. |
| jre.objects.type | jre.objects.type:interface | Finds all files where an interface is defined. |
| jre.objects.labels | jre.objects.labels:abstract | Finds all files where an abstract class is defined. |
| jre.objects.extends | jre.objects.extends:ComplexKeyResource* | Finds all classes which extend the class that starts with ComplexKeyResource. |
| jre.objects.implements | jre.objects.implements:Runnable | Finds all classes which implement the Runnable interface |

A CSS index parses .css and .h files, as shown in table 7:

TABLE 7

| FIELD | EXAMPLE | DESCRIPTION |
|---|---|---|
| css.includes | css.includes:stdio | Finds the files which include stdio |
| css.objects.name | css.objects.name:Hello | Finds all classes which have an object (class, struct, enum) with the name Hello |
| css.objects.type | css.objects.type:struct | Finds all files which have a struct defined in the file. |
| css.objects.extends | css.objects.extends:SomethingEx | Finds all files which have an object that extends SomethingEx |

An SCSS index can be searched as shown in table 8:

TABLE 8

| FIELD | EXAMPLE | DESCRIPTION |
|---|---|---|
| scss.styleguides | scss.styleguides:"large button" | Finds all scss styleguides that start with "large button" |
| scss.mixins | scss.mixins:somethingspecial | Find all files which import the mixin called "somethingspecial" |
| scss.functions | scss.functions:somefunction | Finds all files which import the function called "somefunction" |
| scss.includes | scss.includes:header | Finds all files which include "header" |
| scss.imports | scss.imports:someImport | Finds all files which import "someImport" |

A JSP index can be searched as shown in table 9:

TABLE 9

| FIELD | EXAMPLE | DESCRIPTION |
|---|---|---|
| jsp.includes | jsp.includes:AnotherJsp.jsp | Finds all files which include "AnotherJsp.jsp" |
| jsp .components | jsp.components:*someSomeComponent | Finds the file which use the component called SomeSomeComponent |

Method Overview

Figure 2:
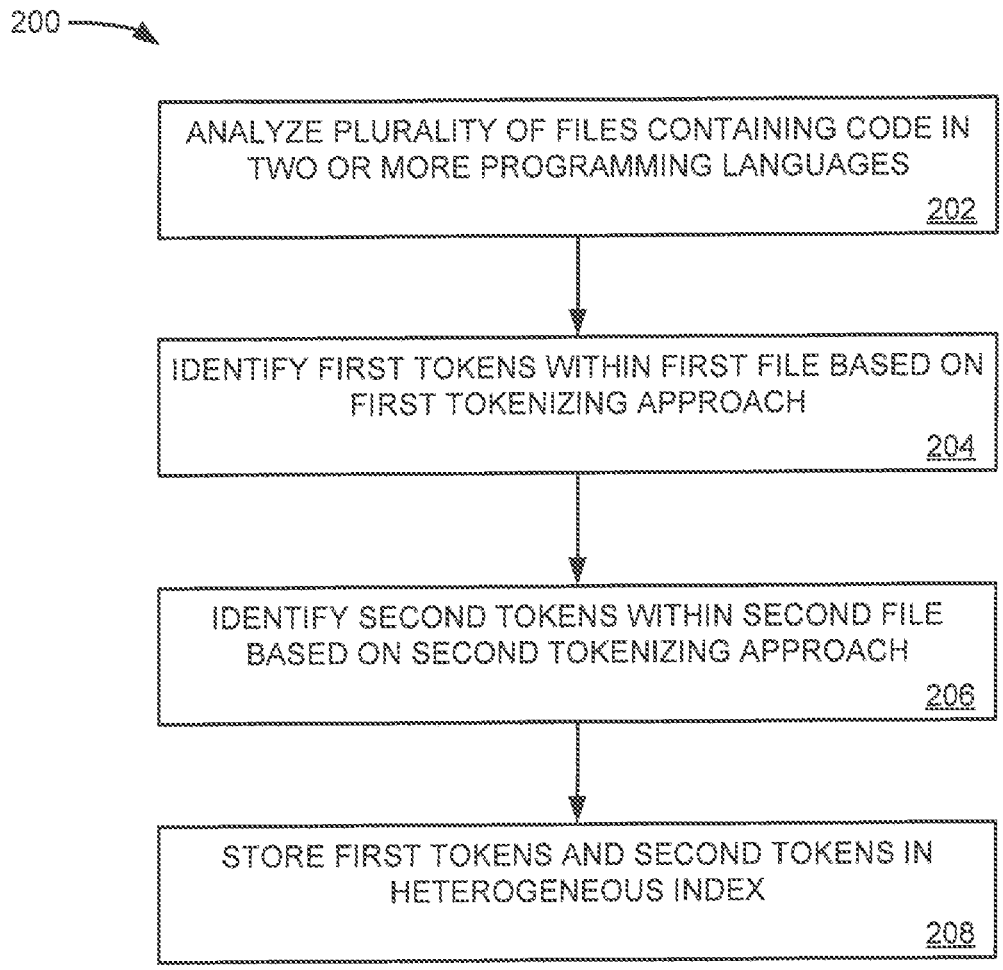
FIG. 2 is flowchart of an example method of adding tokens to a heterogeneous index, according to various embodiments.

FIG. 2 is flowchart of an example method 200 of adding tokens to a heterogeneous index, according to various embodiments. The method 200 can be performed by the computing system 100, according to various embodiments.

In an operation 202, the tokenizers 106, 108, and 110 respectively analyze a plurality of files containing code in two or more programming languages. The files can be stored in the code repository 104. The respective files can be written in one or more programming language.

In an operation 204, the tokenizer 106 identifies first tokens within a first file based on a first tokenizing approach corresponding to the programming language in which the first file is written, as described herein.

In an operation 206, the tokenizer 108 identifies second tokens within a second file based on a second tokenizing approach corresponding to the programming language in which the second file is written, as described herein.

In an operation 208, the first tokens and the second tokens are stored in the heterogeneous index 118. The stored tokens and files are then searchable, as shown in the tables herein.

Figure 3:
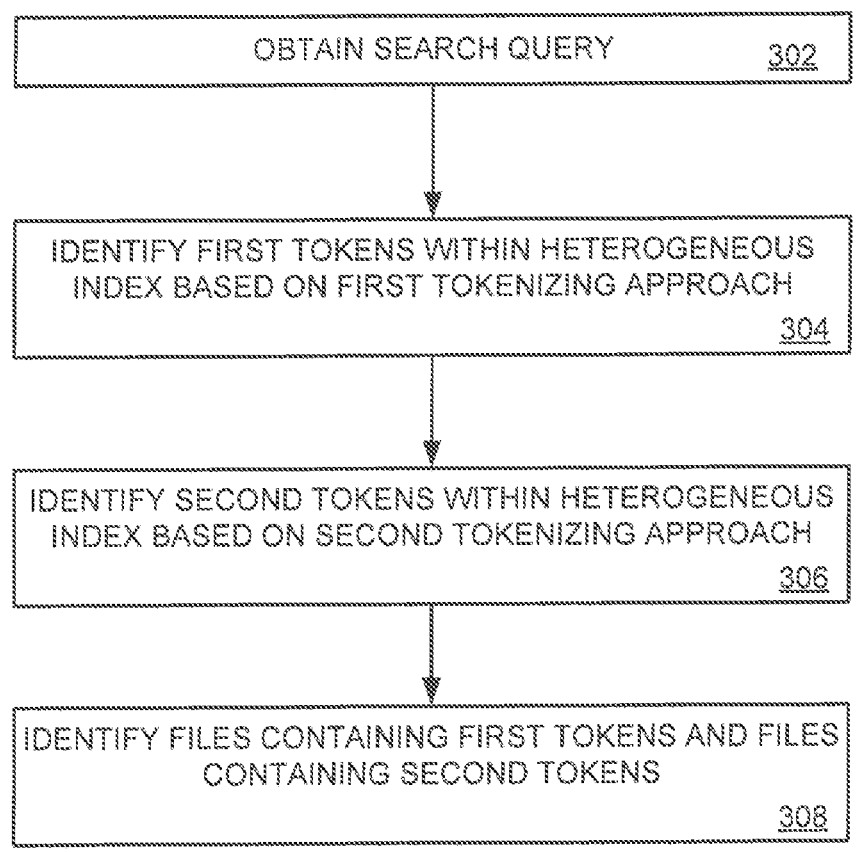
FIG. 3 is a flowchart of an example method of querying the heterogeneous index, according to various embodiments.

FIG. 3 is a flowchart of an example method 300 of querying the heterogeneous index, according to various embodiments. The method 300 can be performed by the computing system 100, according to various embodiments.

In an operation 302, the analyst computer 102 obtains a search query from another computer (not depicted) or from a user of the analyst computer 102. The search query can be of one of the formats depicted in tables 1-10.

In an operation 304, the tokenizer 106 and the parser 112 identify first tokens within heterogeneous index 118 based on a first tokenizing approach, as described herein.

In an operation 306, the tokenizer 108 and the parser 114 identify second tokens within heterogeneous index 118 based on a second tokenizing approach, as described herein.

In an operation 308, the analyst computer 102 identifies files containing first tokens and files containing second tokens, as described herein. The analyst computer 102 may provide a list of the identified files that can be displayed to the user of the analyst computer 102 or sent to another computer (not depicted) in electronic form or return the content or fragments of the content itself.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
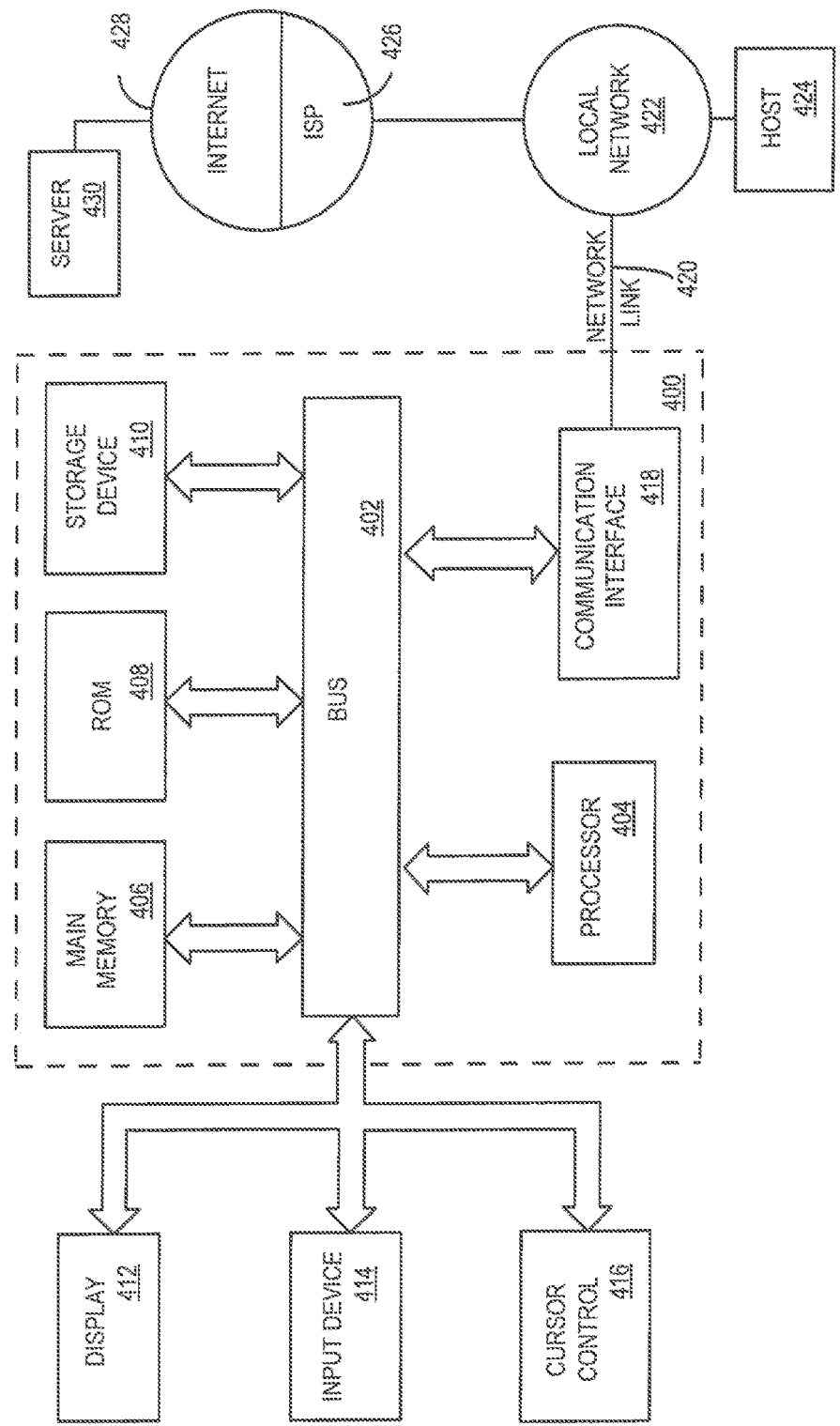
FIG. 4 is a block diagram that illustrates a computer system upon which an embodiment may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   analyzing a plurality of files that includes a first file that contains first code in a first programming language and a second file that contains second code in a second programming language;
   identifying a first plurality of tokens within the first file based on a first tokenizing approach;
   identifying a second plurality of tokens within the second file based on a second tokenizing approach that is different than the first tokenizing approach;
   storing the first plurality of tokens and the second plurality of tokens within a particular index that comprises a plurality of language-specific fields and one or more language-specific values associated with each of the plurality of language-specific fields;
   analyzing the particular index based on a query that specifies a language-specific field of the plurality of language-specific fields and one of the one or more language-specific values associated with the language-specific field;
   returning, in response to the analyzing, an indication of a file comprising the one of the one or more language-specific values associated with the language-specific field;
   wherein the method is performed by one or more computing devices.

2. The method of claim 1, wherein:
   the particular index includes a particular entry that stores a token that is in the first plurality of tokens and the second plurality of tokens;
   the particular entry includes data that identifies the first programming language and the second programming language.

3. The method of claim 1, further comprising:
   receiving a search query that includes one or more terms;
   in response to receiving the search query, determining, based on the particular index, a result of the search query, wherein the result indicates the first file and the second file.

4. The method of claim 3, wherein the one or more terms of the search query comprise one or more Boolean operators.

5. The method of claim 3, wherein the one or more terms of the search query comprise terms identifying the first programming language and/or the second programming language.

6. The method of claim 1, further comprising:
   using a first parsing technique to identify first tokens in the first plurality of tokens;
   using a second parsing technique that is different than the first parsing technique to identify second tokens in the second plurality of tokens.

7. The method of claim 1, wherein the first programming language and the second programming language are selected from a group consisting of: Java, SCALA, Pearl, C++, JSON, SCSS, and JSP.

8. The method of claim 1, further comprising:
   identifying, within the first file, a code block generated when the first file is executed;
   storing, in the particular index, a code block identifier for the code block generated when the first file is executed; and
   storing, in the particular index, an association between the code block identifier and the first file.

9. The method of claim 8, wherein the code block generated when the first file is executed is generated in the second programming language.

10. The method of claim 8, wherein the code block generated when the first file is executed is generated in the first programming language.

11. A data processing system, comprising:
    one or more processors;
    a non-transitory computer-readable medium having instructions embodied thereon, the instructions when executed by the one or more processors, cause performance of:
    analyzing a plurality of files that includes a first file that contains first code in a first programming language and a second file that contains second code in a second programming language;
    identifying a first plurality of tokens within the first file based on a first tokenizing approach;
    identifying a second plurality of tokens within the second file based on a second tokenizing approach that is different than the first tokenizing approach;
    storing the first plurality of tokens and the second plurality of tokens within a particular index that comprises a plurality of language-specific fields and one or more language-specific values associated with each of the plurality of language-specific fields;
    analyzing the particular index based on a query that specifies a language-specific field of the plurality of language-specific fields and one of the one or more language-specific values associated with the language-specific field;

returning, in response to the analyzing, an indication of a file comprising the one of the one or more language-specific values associated with the language-specific field.

12. The data processing system of claim 11, wherein:
the particular index includes a particular entry that stores a token that is in the first plurality of tokens and the second plurality of tokens:
the particular entry includes data that identifies the first programming language and the second programming language.

13. The data processing system of claim 11, wherein the instructions, when executed by the one or more processors, further cause performance of:
receiving a search query that includes one or more terms;
in response to receiving the search query, determining, based on the particular index, a result of the search query, wherein the result indicates the first file and the second file.

14. The data processing system of claim 13, wherein the one or more terms of the search query comprise one or more Boolean operators.

15. The data processing system of claim 13, wherein the one or more terms of the search query comprise terms identifying the first programming language and the second programming language.

16. The data processing system of claim 11, wherein the instructions, when executed by the one or more processors, further cause performance of:
using a first parsing technique to identify first keywords in the first plurality of tokens;
using a second parsing technique that is different than the first parsing technique to identify second keywords in the second plurality of tokens.

17. The data processing system of claim 11, wherein the first programming language and the second programming language are selected from a group consisting of: Java, SCALA, Pearl, C++, JSON, SCSS, and JSP.

18. The data processing system of claim 11, wherein the instructions, when executed by the one or more processors, further cause:
identifying, within the first file, a code block generated when the first file is executed;
storing, in the particular index, a code block identifier for the code block generated when the first file is executed; and
storing, in the particular index, an association between the code block identifier and the first file.

19. The data processing system of claim 18, wherein the code block generated when the first file is executed is generated in the second programming language.

20. The data processing system of claim 18, wherein the code block generated when the first file is executed is generated in the first programming language.

* * * * *